Figure 1:
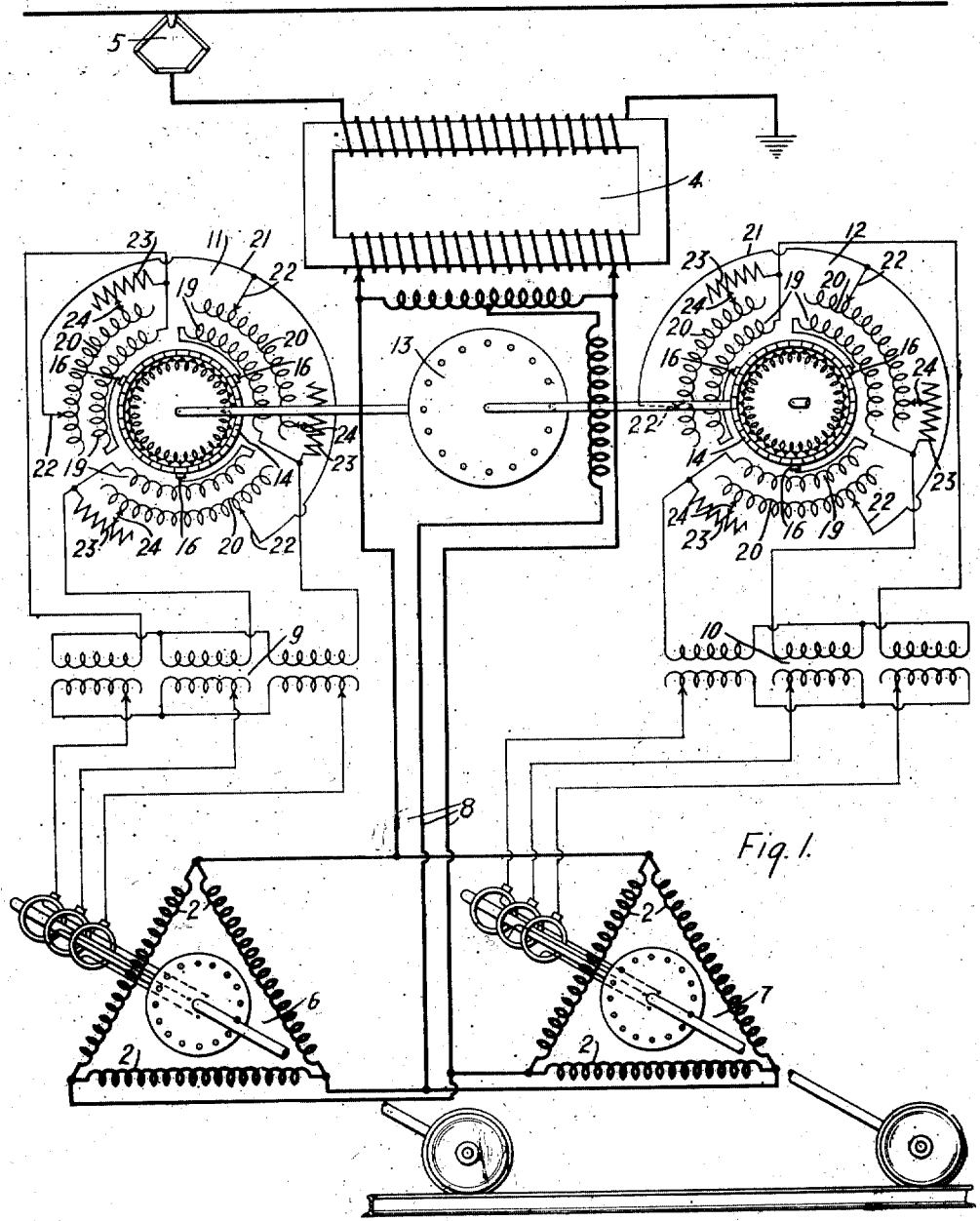

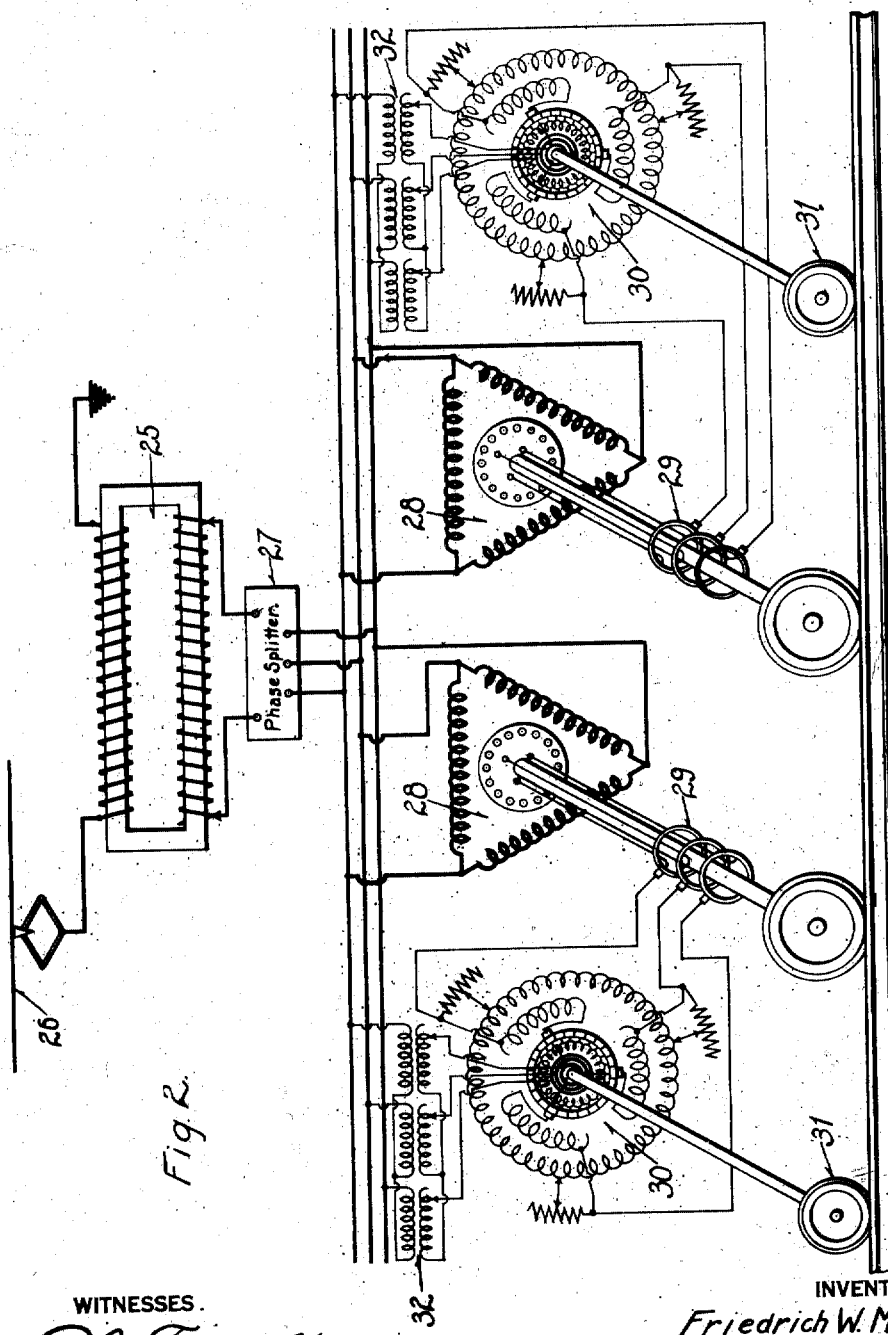

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF LOCOMOTIVE CONTROL.

1,275,969.  Specification of Letters Patent.  Patented Aug. 13, 1918.

Application filed March 24, 1915. Serial No. 16,683.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Systems of Locomotive Control, of which the following is a specification.

My invention relates to electric railway systems, and it has for its object to provide means whereby electric locomotives, especially those of the split-phase type, may be conveniently started and whereby the speed, power factor and load distribution in a plurality of motors may subsequently be regulated.

In the accompanying drawing Figure 1 is a diagrammatic view of the electrical equipment of a railway vehicle provided with one form of my invention; and Fig. 2 is a diagrammatic view of a modification of the equipment shown in Fig. 1.

In the operation of electric railway systems, it is desirable to employ single-phase high-voltage distribution in the line for reasons of economy but no single-phase alternating-current motor has as yet been developed which is entirely satisfactory for heavy traction purposes. It has, therefore, been proposed to employ polyphase induction motors for propulsion and to convert energy derived from the line into a form suitable for the supply of the motors by a phase-splitting device, preferably of the rotary type. As phase-splitting devices of this character have the starting characteristics of single-phase motors, it is generally necessary to provide them with auxiliary starting apparatus. The polyphase induction motor is essentially a single-speed machine and, in order to provide flexible speed regulation therefor, it has been a common practice to provide cascading arrangements in connection with adjustable secondary resistance members, with attendant heavy losses. It is, therefore, desirable to equip a railway vehicle with energy-changing apparatus, whereby energy derived from the secondary members of the induction motors in the speed regulation thereof may be returned to the primary windings. Furthermore, it is extremely difficult to maintain the driving wheels of a heavy electric vehicle, such, for example, as a locomotive, at the same diameters because of uneven wear and because of the heavy machining necessary, in some cases, to remove defects, such as flaws and flat spots. As a result, the induction motors connected to two driving wheels of different diameters would tend to operate at different speeds, and the slight resultant differences in slip frequencies would cause a radical difference in the torques exerted by the motors, with resultant unequal distribution of the load and serious heating in the overloaded motors. It is desirable, therefore, to equip the vehicle with apparatus for power-equalizing purposes and, in addition, apparatus should be installed for improving the power factor in the motors for economy in power transmission. By my invention, I provide one, or at the most, two sets of auxiliary apparatus on a railway vehicle which will accomplish all of the above-mentioned results in an effective manner, with considerable saving in weight and complexity of circuits. Furthermore, the arrangement is such that I may conveniently increase the starting torque through the operation of the auxiliary apparatus directly on propulsion wheels, thus permitting the use of smaller propulsion motors.

Referring to the form of my invention shown in Fig. 1, a single-phase high-voltage trolley line supplies energy to the primary winding of a vehicle transformer 4 through a suitable contact device 5. A phase converter or phase splitter 13 of the rotary type derives energy from the secondary winding of the transformer 4 and supplies said energy, in the form of polyphase current, to the primary windings 2 of polyphase propulsion motors of the induction type through suitable mains 8. The secondary members of the motors 6 and 7 are of the wound type and supply energy, through suitable slip rings, to two polyphase transformers 9 and 10 connected, in turn, to two polyphase commutator motors 11 and 12. The machines 11 and 12 are mounted on the shaft of the phase converter 13 so that, under certain conditions, they may assist in driving the same and, under other conditions, may derive mechanical energy there-from. Each of the machines 11 and 12 is provided with armature windings connected to a commutator 14. The three brushes 16 bear upon each of the commutators 14 at points 120 electrical degrees apart and are connected to the slip rings of the secondary windings of the motors 6 and 7 through the adjustable transformers 9 and 10. Compensating windings 19 are connected between each of the brushes 16 and their respective supply mains for assistance in commutation. Suitable working windings 20 are connected in star to the supply mains of the machines 11 and 12, the star relation being achieved, in each case, by a bond wire 21 suitably connected to the respective windings by adjustable taps 22—22. Each of the windings 20 derives energy from its respective main, through an adjustable rheostat 23, connection between the rheostat and the winding being made by adjustable tap members 24.

Having thus described the structure of my invention, the operation is as follows: The phase converter 5 may be either of the self-starting type or it may be brought up to speed by a special starting motor or by the application of single-phase current from the source of supply to one of the machines 11 and 12. As a result, of the operation of the phase converter 13, polyphase current is supplied through the mains 8 to the primary windings of the propulsion motors 6 and 7. At the start, a high secondary voltage is desired in the propulsion motors, and the ratio of transformation of the transformers 9 and 10 is therefore set at a low value, whereupon, current derived from the secondary windings of the machines 6 and 7 is supplied to the machines 11 and 12 operating as motors for the driving of the machine 13 partially as a generator. By subsequent adjustment of the transformers 9 and 10, the secondary voltage and, consequently, the speed of the motors 6 and 7 may be adjusted in a simple and convenient manner. By the adjustment of the star taps 22—22, the axis of magnetization of the magnetizing windings 20 may be changed, with consequent adjustment of the power factor of the machines 6 and 7, and, by the adjustment of the rheostats 23, the strength of the magnetizing fields in the machines 11 and 12 may be changed for load equalization. The motor connected to a drive wheel slightly under size should have its speed slightly increased for proper load distribution. Its secondary energy output should therefore be decreased, and the corresponding commutator motor is therefore adjusted to exert slightly less than normal driving torque. In like manner, the auxiliary motor associated with a propulsion motor coupled to an oversize driver should be excited to exert slightly over-normal driving torque.

The currents in the two auxiliary machines would be substantially equal but that in the auxiliary machine exerting small torque would have a large wattless component whereas that in the machine exerting large driving torque would have a large watt component.

Furthermore, the fact that a polyphase commutator machine can operate either as a motor or as a generator enables one to obtain a flexible arrangement with but small auxiliary machines. For example, when running at or near synchronism, the machine associated with a propulsion motor coupled to an undersize driver may be operated as a generator and supplying energy to the induction motor secondary for over-synchronous operation, while the auxiliary machine associated with a motor coupled to an oversize driver may be operating as a motor and deriving energy from the induction motor secondary member for under-synchronous operation.

Referring to the form of my invention shown in Fig. 2, energy is supplied to a vehicle transformer 25 from a single-phase line 26 and flows to a phase splitter 27 or any suitable form where it is converted into polyphase current for supply to the primary windings of polyphase propulsion motors 28 of the induction type. Current derived from the secondary members of the motors 28 through suitable slip rings 29 is supplied to polyphase commutator machines 30, in general form similar to the machines 11 and 12 in Fig. 1. The machines 30—30 are coupled to pony wheels 31 for a double purpose to be hereinafter pointed out. Current derived from the machines 30—30 may be returned to the supply buses of the machines 28 through suitable adjustable transformers 32—32. The fields of the machines 30—30 differ from those of the machines 11 and 12 of Fig. 1 in that the magnetizing windings thereof are delta connected rather than star connected.

In the operation of the device shown in Fig. 2, the phase-splitter 27 is brought up to speed in any desired manner and, thereupon, supplies polyphase current to the motors 28—28. The transformers 32—32 are initially given a low ratio of transformation in order that, at starting, there may be a high secondary voltage in the secondary members of the motors 28—28. A portion of the energy derived from the slip rings 29—29 is converted into mechanical energy and supplied to the pony wheels 31—31 for providing large starting torque and the remainder thereof returns to the supply buses of the machines 28—28 through the transformers 32—32. As in the circuit of Fig. 1, adjustment in the power factor of the motors 28—28 may be made by shifting the axes of the fields of the magnetizing windings of the machines 30—30, and uneven distribution of the load between the motors 28—28, arising from unequal wheel diameters, may be accurately compensated for by proper adjustment of the strength of the working fields of the machines 30—30 and of the ratios of transformation of the transformers 32—32.

If desired, the auxiliary machines 30—30 in Fig. 2 may be merely polyphase motors, as employed in Fig. 1. In this case, the secondary energy of the main motors is converted into mechanical power for application to the pony axle, rather than appearing at the polyphase buses.

Attention is directed to the fact that with the circuits of Fig. 2, over-synchronous speed may be readily obtained in the motors 28—28 by deriving current from the polyphase buses and supplying it to the motor secondary members through the auxiliary machines.

While I have shown my invention in two distinct embodiments only, it will be apparent to those skilled in the art that it is susceptible of various minor changes and modifications without departing from the spirit thereof and I desire, therefore, that no limitations shall be placed thereupon except such as are imposed by the prior art or are specifically set forth in the appended claims.

I claim as my invention:

1. In an alternating-current system of distribution, the combination with a source of alternating current of one phase-number, of an induction motor of another phase-number, a phase-converter for deriving currents from said source suitable for application to said motor, and means for deriving energy from the secondary member of said induction motor in the speed variation thereof and for returning said energy to the system through said phase-converter.

2. In an alternating-current system of distribution, the combination with a source of alternating current of one phase-number, of an induction motor of another phase-number, a rotary phase-converter for deriving currents from said source suitable for application to said motor, an alternating-current commutator machine mechanically coupled to the shaft of said phase-converter, and an adjustable transformer connected between the secondary winding of said induction motor and said commutator machine, whereby energy may be interchanged between said induction motor and said phase-converter.

3. In an alternating-current system of distribution, the combination with a source of single-phase alternating current, of a polyphase induction motor, a phase-converter for deriving current from said source suitable for application to said motor, and means for deriving energy from the secondary member of said induction motor in the speed variation thereof and for returning said energy to the system through said phase-converter.

4. In an alternating-current system of distribution, the combination with a source of single-phase alternating current, of a polyphase induction motor, a rotary phase-converter for deriving currents from said source suitable for application to said motor, an alternating current commutator machine mechanically coupled to the shaft of said phase converter, and an adjustable transformer connected between the secondary winding of said induction motor and said commutator machine, whereby energy may be interchanged between said induction motor and said phase-converter.

5. In an alternating-current system of distribution, the combination with a source of single-phase alternating current, of a polyphase induction motor, a rotary phase-converter for deriving currents from said source suitable for application to said motor, an alternating current commutator machine mechanically coupled to the shaft of said phase-converter, an adjustable transformer connected between the secondary winding of said induction motor and said commutator machine, whereby energy may be interchanged between said induction motor and said phase-converter, and means for varying the field of said polyphase commutator machine to adjust the power factor of the system.

6. In an alternating-current system of distribution, the combination with a source of single-phase alternating-current, of a plurality of polyphase induction motors, a phase-converter for deriving currents from said source suitable for application to said motors, and means for interchanging energy between the secondary members of said induction motors for load equalization therebetween, said last-named means being further arranged for interchanging energy between said motors and said phase-converter.

7. In an alternating-current system of distribution, the combination with a source of single-phase alternating current, of a plurality of polyphase induction motors, a rotary phase-converter for deriving currents from said source suitable for application to said motors, and a polyphase commutator machine electrically connected to the secondary member of each induction motor, respectively, and mechanically coupled to said rotary phase converter, whereby energy derived from under-loaded motors is transferred to overloaded motors for load equalization.

8. The method of operating a plurality of induction motors subject to unequal loads and deriving energy from a source of alternating current through a dynamo-electric phase-converter, both the primary and secondary members of said motors being dynamically connected to said phase-converter, which comprises transferring energy from the secondary member of an underloaded motor to the secondary member of an overloaded motor, when said motors are operating near synchronism, and transferring unequal amounts of energy between the secondary members of said two motors and said source through said phase-converter when operating away from synchronism, whereby the loads on said motors may be substantially equalized.

In testimony whereof I have hereunto subscribed my name this 12th day of March, 1915.

FRIEDRICH W. MEYER.

Witnesses:
 D. C. DAVIS,
 B. B. HINES.